United States Patent [19]
Stephenson

[11] 3,899,145
[45] Aug. 12, 1975

[54] LASER TRANSMITTING AND RECEIVING LENS OPTICS

[75] Inventor: Andrew N. Stephenson, Camarillo, Calif.

[73] Assignee: The United States of America as represented by the Secretary of the Navy, Washington, D.C.

[22] Filed: July 20, 1973

[21] Appl. No.: 381,193

[52] U.S. Cl............ 244/3.13; 244/3.16; 250/203 R; 350/6
[51] Int. Cl............................................. F42b 15/02
[58] Field of Search........ 356/4, 5, 141, 152; 350/6, 350/7; 250/203 R; 244/3.15, 3.16, 3.13

[56] References Cited
UNITED STATES PATENTS

| | | | |
|---|---|---|---|
| 2,966,591 | 12/1960 | McCartney | 350/6 |
| 3,256,766 | 6/1966 | Allesson | 356/5 |
| 3,401,590 | 9/1968 | Massey | 356/5 |
| 3,551,050 | 12/1970 | Thorlin | 356/4 |

Primary Examiner—Richard A. Farley
Assistant Examiner—S. C. Buczinski
Attorney, Agent, or Firm—Richard S. Sciascia; Joseph M. St. Amand

[57] ABSTRACT

An optical system utilizing a concentric Bouwers lens having in the converging beam another lens to create parallel light paths to the concentric point of the Bouwers lens. At such concentric point, a mirror directs the light to the side. Upon reversal of the light paths, a parallel light beam (or laser) enters the system from the side, through the assembly to a target, and then back to the starting point where it is detected.

7 Claims, 4 Drawing Figures

LASER TRANSMITTING AND RECEIVING LENS OPTICS

BACKGROUND OF THE INVENTION

This invention relates to optical lens systems and particularly to a more practical and efficient lens arrangement for optical radar, laser line scanners, laser television, and laser target designators.

In previous systems, two completely separate and entire lens systems have been mounted on a scanning or stabilized gimbal, or else the receiver lens was fixed with a very large field of view which lowered its sensitivity. The previous systems either required greater mass and larger gimbals or had lower sensitivity.

The present invention is for a Galilean concentric Bouwers lens for scanning a collimated beam wherein the mirror and negative elements scan within the lens system and operates in both transmit and receive modes. This invention is particularly well suited for a reconnaissance device in the area of optical augmentation techniques.

The advantages over prior methods involve cost, volume reduction, and efficiency. The cost advantage is implicit in the fact that a smaller mass is gimballed and that the problem of maintaining boresight is very greatly reduced. A smaller gimballed mass closer to the point of rotation makes high angular acceleration much more efficient and the lack of boresight error makes high rates of motion also more practical.

Other objects, advantages and novel features of the invention will become apparent from the following detailed description of the invention when considered in conjunction with the accompanying drawings.

DESCRIPTION OF THE PREFERRED EMBODIMENT

Figure 1:
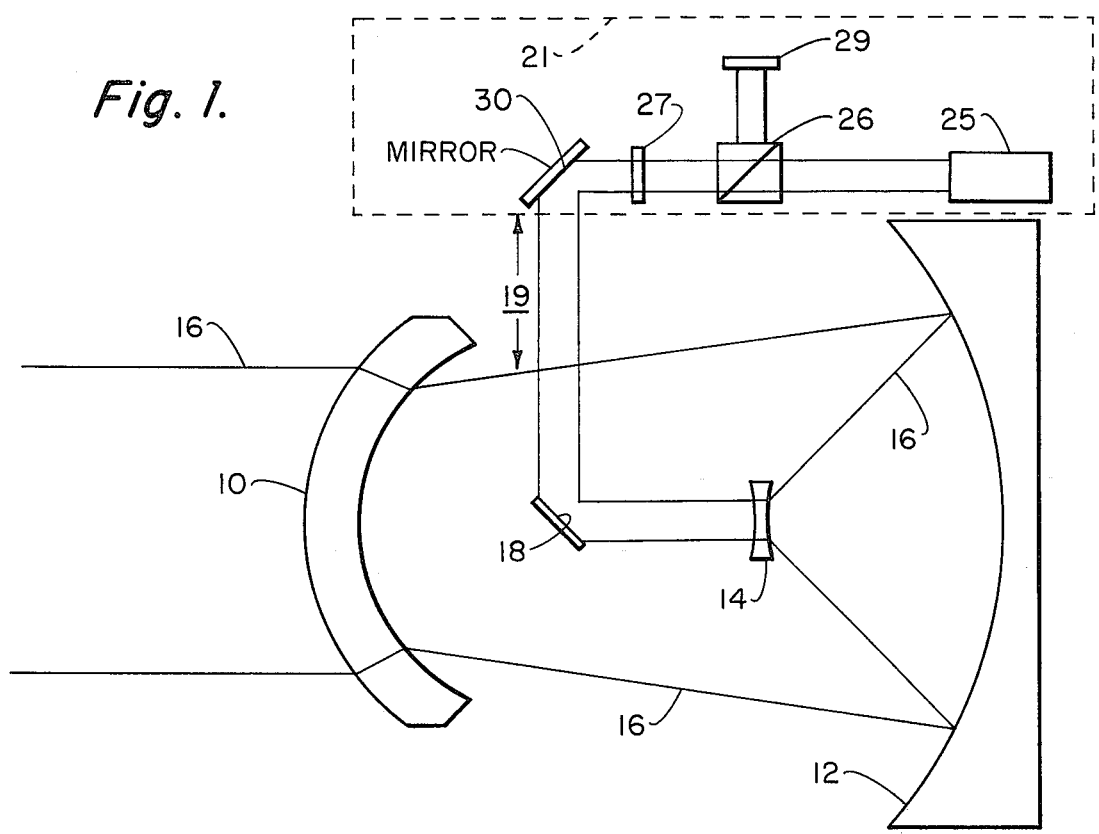
FIG. 1 is a diagrammatic illustration of a preferred embodiment of the invention.

The present invention comprises a convex meniscus lens 10 and a concave mirror 12 forming a concentric Bouwers lens system which has a negative element 14 inserted in the converging beam 16 just before the focal surface, as shown in FIG. 1, thus forming a Galilean concentric Bouwers lens system. The negative element 14 near the focal surface is designed in such a manner as to "afocalize" the converging beam, i.e., so that the Bouwers lens 10, 12 will no longer focus.

A parallel beam 16 entering the system via lens element 10, reflecting from lens element 12 to negative element 14, will be directed from negative element 14 to the concentric point of the Bouwers lens system. A mirror 18 at this concentric point then directs the parallel beam to the side of the lens system at 19, as shown in FIG. 1. When a parallel light beam or laser enters the lens from side 19, it will be directed by mirror 18 to negative element 14 which now acts as an expanding element. The light beam passes through element 14 and then from Bouwers lens element 12 through lens element 10 to emerge again as parallel light. If this light beam then strikes a distant object, a small portion will be reflected back along the beam through the Bouwers lens 10, 12, element 14 and reflected by mirror 18 to the side of the lens system.

This relationship of lenses and mirrors is used to scan the laser beam about the concentric point of the Bouwers lens. In the arrangement shown in FIG. 1, the scan motion of the mirror 18 and negative element 14 are one to one in the plane normal to the plane of the drawing, i.e., if the negative element scans 45°, the mirror must rotate 45°. However, in the plane of the drawing, when the negative element 14 scans 45°, the mirror must rotate only 22.5°.

Figure 2:
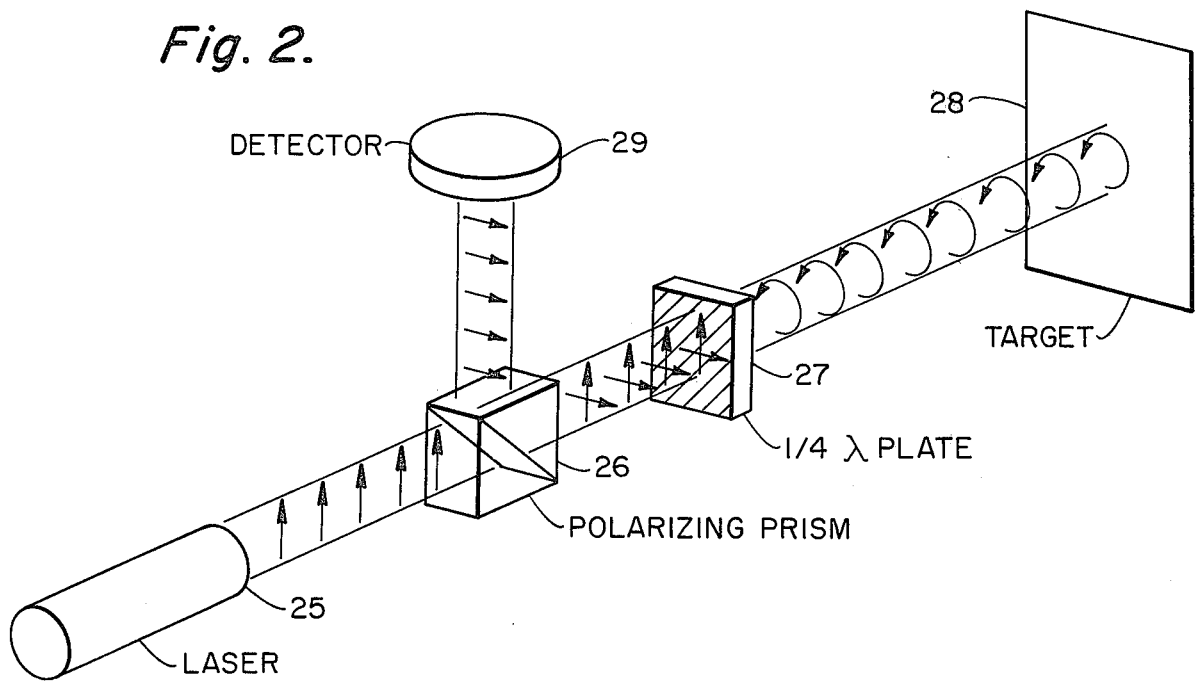
FIG. 2 illustrates a polarizing scheme for use with the optics of FIG. 1.

In the parallel beam on side 19 of the lens optics, a detector 20 can receive through the circular polarization device 21, shown in FIG. 2, thus allowing the lens to both transmit and receive pulsed light.

This method allows the outgoing laser pulse and the incoming signal to share the same aperture. As shown in FIG. 2, vertically polarized light, for example, from laser 25 enters from the left and passes through the polarizing prism 26 to the ¼ wave plate 27. The fast axis of the ¼ wave plate is oriented 45° from the vertical to produce right hand circular polarized light. The right hand circular polarized light illuminates the surface of a target 28. Here the light is reflected and scattered in all directions. The backscattered portion returns to the system. In its new direction, the polarized light appears to the ¼ wave plate as left hand circular; it is, therefore, converted to horizontal polarized light. The polarizing prism then reflects the horizontally polarized energy to the detector 29. A mirror 30, for example, as shown in FIG. 1, may be used to reflect the light beam, depending upon the orientation or location of polarization device 21. U.S. Pat. No. 3,401,590 discloses a polarization technique such as in polarization device 21. The negative element 14 and concentric point mirror 18, mounted on gimbal 32, are operable to scan the focal surface of the Bouwers lens arrangement and pass incoming signals through the common aperture at 19 to detector 20 or transmit signals from laser 25 to concave mirror 12 and out through lens element 10. The focal surface is shown at 34 in FIG. 3.

Figure 3:
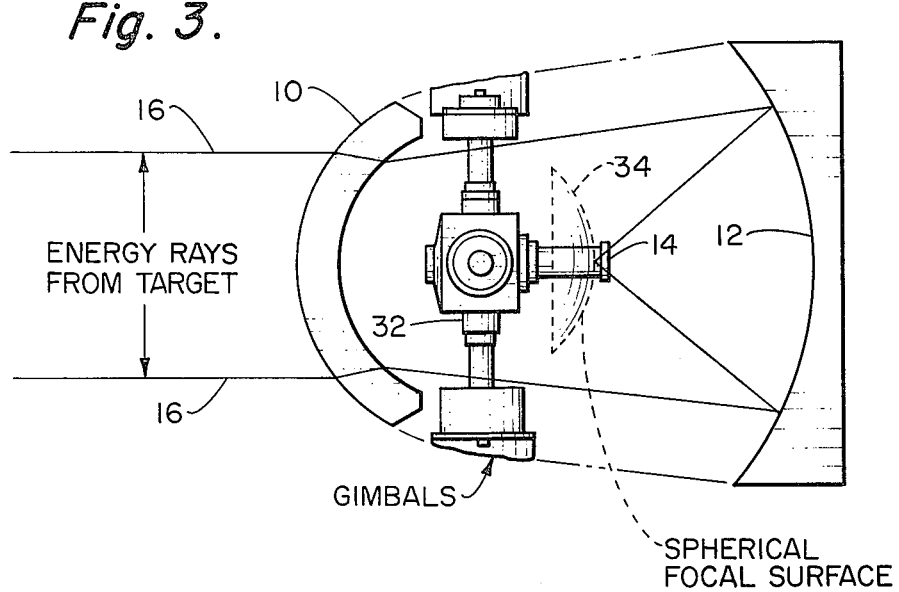
FIG. 3 shows a gimball means for use with the invention.

This system can employ line of sight stabilization, i.e., the output beam can be stabilized in inertial space by gimballing the negative element 14 and mirror 18, employing a system such as shown in FIG. 3 and as disclosed in U.S. Pat. No. 3,729,152, issued Apr. 24, 1973, for "Inertially-Stabilized Optical System for Missiles."

Figure 4:
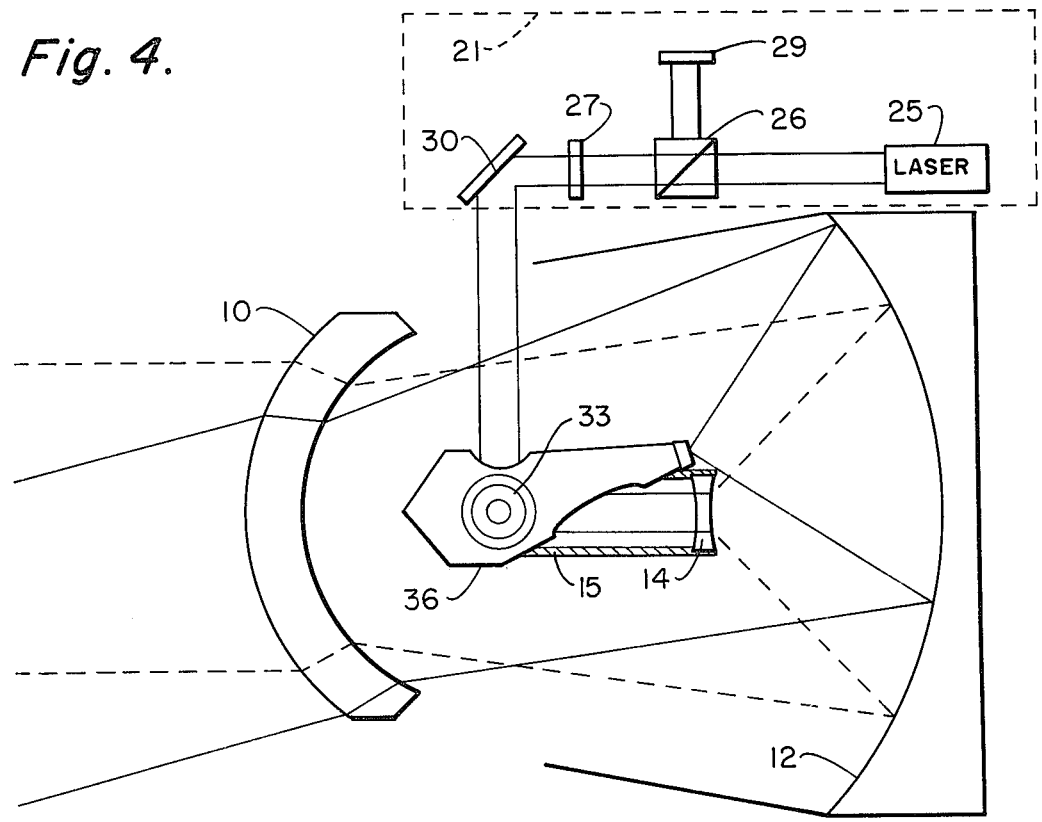
FIG. 4 shows another embodiment of the invention.

The lens optics 10 and 12 of the present system can be used in both transceiving and passive modes at the same time or sequentially, as shown in FIG. 4, by placing both lens 14 which is supported by a tubular mount 15 as in FIG. 3 and a second detector or TV camera tube 36 on common scanning gimbals 33. In this arrangement the two systems are separate, i.e., they do not share a common boresight; they simply share a collecting lens assembly 10, 12 and a common stabilization gimbal 33, such as gimbal 32 in FIG. 3. With such a system, one can share a target designator/rangefinder with a wide field laser search set. Also, an optical radar using the transceiving lens 10, 12 can be used in a similar arrangement as in FIG. 4 with a TV camera tube for positive identification of the acquired target. In the field of missile seekers, this system can be mounted in a missile head and used for active homing (transceiving) or beam riding (passive), depending upon signal strength or command.

There are many alternatives. In the area of military applications, such as target designators and laser search sets, additional detectors can be mounted on the scanning gimbal 32, which can be brought to boresight sequentially by the gimbal or simply scan adjacent areas. The use of multiple detectors on the gimbal can allow several fields of view and sensitivities to be searched at the same time.

Obviously, many modifications and variations of the present invention are possible in the light of the above teachings. It is therefore to be understood that within the scope of the appended claims, the invention may be practiced otherwise than as specifically claimed.

I claim:

1. A single optical lens system for both transmitting and receiving laser and other type parallel light beams comprising:
   a. a convex meniscus lens element and a concave mirror forming a Bouwers lens arrangement;
   b. a negative lens element immediately ahead of the focal surface of said Bouwers lens assembly, forming a Galilean concentric Bouwers lens assembly;
   c. said negative element being used to afocalize an incoming converging laser beam so that the Bouwers lens arrangement collimates and directs the laser beam entering the system via said convex lens element and concave mirror to the concentric point of the Bouwers lens arrangement;
   d. a single mirror surface at said concentric point of the Bouwers lens arrangement for directing said incoming laser beam to one side of the lens assembly;
   e. a laser beam entering said lens system from said one side of said assembly being directed by said concentric point mirror surface to the negative element which then acts as an expanding element for directing the laser beam to said concave mirror where it is reflected to said convex lens element and passed therethrough to emerge therefrom as a parallel light beam;
   f. said lenses and mirrors assembly and the relationship thereof being mounted for operating to scan the focal surface of the Bouwers lens arrangement at high angular acceleration and high rates of motion;
   g. a laser generating means at said one side of the lens assembly for generating a laser beam to be directed through said lens assembly toward a target;
   h. a laser detector means also at said one side of the lens assembly for detecting incoming and reflected laser signals from a target;
   i. said laser generating means and said laser detecting means employing a common aperture and a common polarization means at said one side of the lens system to both transmit and receive laser signals.

2. A laser optical lens system as in claim 1 wherein said negative element and concentric point mirror are provided with a gimballing means for scanning the focal surface of said Bouwers lens arrangement and for stabilizing an output laser beam in inertial space.

3. A laser optical lens system as in claim 1 in which the system is mounted in the head of a guided missile and used as a seeker in the missile guidance system thereof for either active homing and beam riding use.

4. A laser optical lens system as in claim 1 wherein said common polarization means is a circular polarization device which comprises:
   a. a ¼ wave plate;
   b. a polarizing prism;
   c. said polarizing prism permitting laser light from said laser generating means which is polarized in one direction only to pass through to said ¼ wave plate;
   d. said ¼ wave plate being oriented to change the polarization of said laser light beam to circular polarized light, said circular polarized light then passing through the lens system and emerging to illuminate a target;
   e. the backscattered portion of light reflected from a target entering the lens system being directed therethrough to said common polarization means where said returning light appears to said ¼ wave plate as being circular polarized in the opposite direction from that transmitted and thus is passed to said polarizing prism as light crossed polarized 90° to the polarization of said prism;
   f. said polarizing prism reflecting said 90° crossed polarized light to said laser detector means and not allowing it to pass back through the prism to said laser generating means.

5. A laser optical lens system as in claim 1 wherein:
   a. a gimball means is provided for stabilization of said negative lens element;
   b. a second detector means being mounted on and sharing said gimball means along with said negative lens element, said second detector means having a different boresight than said negative lens element but sharing said convex meniscus lens element and concave mirror arrangement therewith thereby permitting said lens arrangement to be used both in transceiving and passive modes at the same time, sequentially, as desired.

6. A laser optical lens system as in claim 5 wherein said second detector is a television camera tube.

7. A laser optical lens system as in claim 6 for use as an optical radar wherein said television camera tube is used for positive identification of an acquired target detected from incoming return signals.

* * * * *